Dec. 11, 1923.  
N. P. LARSON  
SAFETY NECK YOKE  
Filed Jan. 8, 1923  
1,477,066
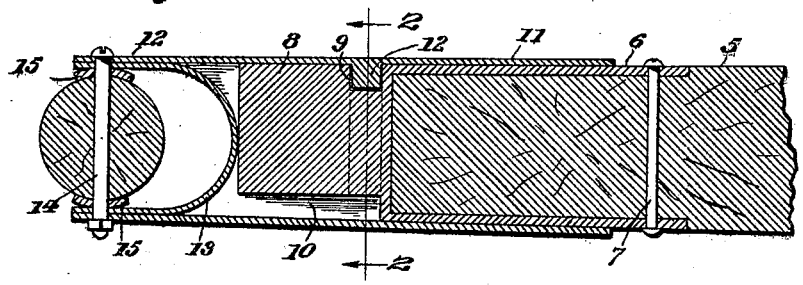
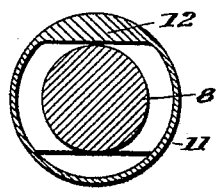   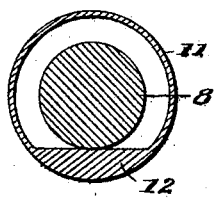
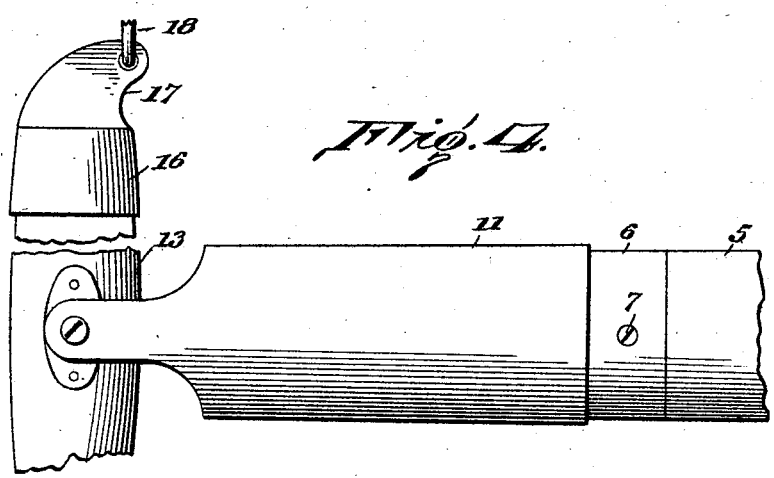
Inventor  
Nathaniel P. Larson  
By William J. Jacobi  
Attorney Patented Dec. 11, 1923.

1,477,066

UNITED STATES PATENT OFFICE.

NATHANIEL P. LARSON, OF EAGLE BEND, MINNESOTA.

SAFETY NECK YOKE.

Application filed January 8, 1923. Serial No. 611,343.

*To all whom it may concern:*

Be it known that NATHANIEL P. LARSON, a citizen of the United States, residing at Eagle Bend, in the county of Todd and State of Minnesota, has invented certain new and useful Improvements in Safety Neck Yokes, of which the following is a specification.

My invention relates to neckyokes for draft poles for vehicles and its principal object is to provide a neckyoke wherein the danger of the lines becoming caught is obviated.

A further object of the invention is to provide a neckyoke for draft tongues which will prevent the reins or lines from being caught in the pole thus endangering the draft animals and at the same time is detachably and positively held on the tongues.

It is also an object of the present invention to provide a device of this type which may be mounted upon any type of draft pole and will not necessitate altering the parts of the latter.

With the preceding and other objects and advantages in mind the invention consists in the novel combination of elements, constructions and arrangement of parts and operation to be hereinafter specifically referred to, claimed and illustrated in the accompanying drawing, wherein Figure 1 is a longitudinal sectional view of a draft pole embodying my invention;

Figure 2 is a vertical transverse sectional view of same on the line 2—2 in locked position, Figure 3 is a similar view showing the parts in position preparatory to adjusting the same in locked position; and Figure 4 is a plan view of the device associated with a draft pole and neckyoke proper.

Referring to the drawing in detail wherein corresponding characters of reference denote corresponding parts throughout the several views the numeral 5 designates a draft tongue or pole and received thereon is a thimble 6 retained to the pole by transverse pins 7. This thimble 6 is formed with a forwardly extending rounded extension 8 having a circumferential groove 9 and a flattened cut away under surface 10. A second thimble which is of greater length than the thimble 6 is designated at 11 and is formed with a transverse key or web 12 adapted to be received in the groove 9. In assembling the sleeve 11 with the sleeve 6 the former is slipped on the sleeve 6 with the key or web 10 disposed beneath the cut away or flattened surface 10 and when the same is disposed in vertical alinement with the groove 9 the sleeve 11 is rotated in the position shown in Fig. 2 also locking the parts together.

The forward end of the sleeve 11 terminates in spaced parallel ears 12 which embrace the neckyoke 13 and is secured thereto by a vertical pin 14. Wear plates 15 are interposed between the inner faces of the ears 12 and the outer faces of the neckyoke 13. The ends of the neckyoke 13 carry the usual ferrules 16 provided with extensions 17 on which the animal attaching rings 18 are engaged, the latter being engageable with parts of the harness in the usual manner.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:—

1. The combination with an animal draft pole provided with a flat face at one end, a thimble also having a flat face to coincide with the flat face of the pole and received on the latter, an extension carried by the thimble and provided with a circumferential groove, a sleeve receivable on the thimble, and an internally arranged lug carried thereby adapted to be received in the groove upon arranging the sleeve in a position to dispose the lug coincident to the cut away surface and rotating the sleeve.

2. The combination with an animal draft pole having a thimble embracing the end of the pole, an extension carried thereby provided with a circumferential external groove and a cut away face and a sleeve receivable on the thimble, a locking key formed upon the inner face of the sleeve and adapted to be positioned in the groove upon arranging the sleeve in a position where the locking key will be coincident to the flat cut away face and thence rotating the sleeve.

In testimony whereof I affix my signature.

NATHANIEL P. LARSON.